Feb. 26, 1952  A. S. FAWCETT  2,587,302
PORTABLE ARMREST
Filed Jan. 29, 1951
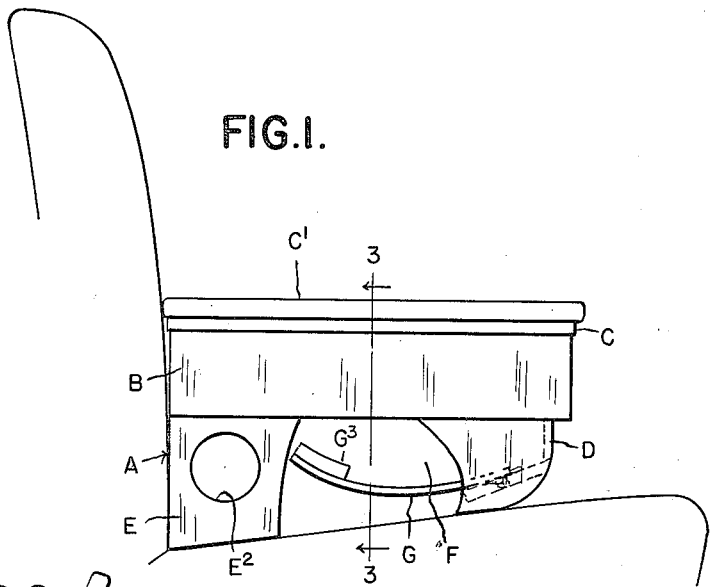
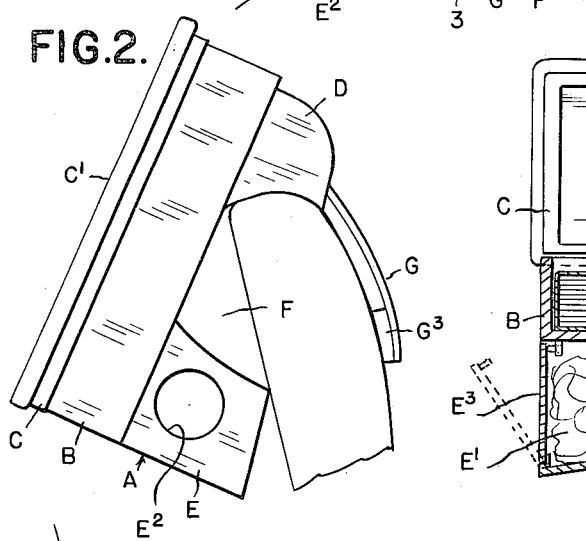
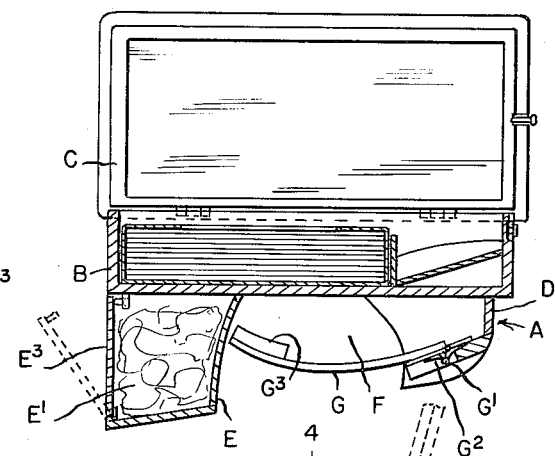
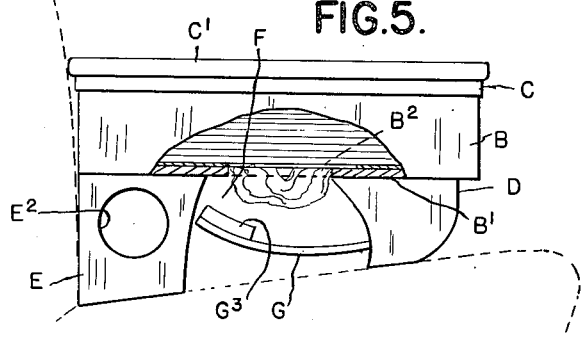
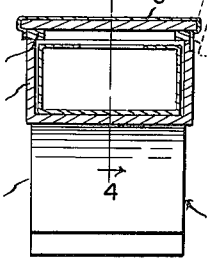
INVENTOR.
ALLARD S. FAWCETT
BY
*Whittemore Hulbert & Belknap*
ATTORNEYS Patented Feb. 26, 1952

2,587,302

UNITED STATES PATENT OFFICE 2,587,302

PORTABLE ARMREST

Allard S. Fawcett, Detroit, Mich.

Application January 29, 1951, Serial No. 208,340

5 Claims. (Cl. 155—112)

The invention relates to arm rests for use in connection with seats of automobiles or other vehicles.

It is the object of the invention to obtain a portable construction which is adapted for use with any vehicle seat and may be readily transferred from one seat to another.

It is a further object of the invention to obtain a construction which will not interfere with the user of the seat either in entrance or withdrawal.

It is a further object to obtain a construction which has other uses than merely that of an arm rest, such as an easily accessible receptacle for various articles that may be used by the occupant of the seat.

It is a further object to obtain a construction which is particularly adapted for use on the front seat by the driver of the car.

With these objects in view the invention consists in the construction as hereinafter set forth.

In the drawings:

Fig. 1 is a side elevation of the arm rest in position for use on a vehicle seat;

Fig. 2 is a similar view showing the arm rest in stored position;

Fig. 3 is a cross section on line 3—3, Fig. 1;

Fig. 4 is a section on line 4—4, Fig. 3, showing the hinged cover in raised position;

Fig. 5 is a view similar to Fig. 1 but partly in section showing a modified construction.

For long distance riding and particularly for the driver of a motor car, fatigue is lessened by providing arm rests. However, a rest that is located intermediate the ends of the seat will interfere with easy entrance or leaving of the same. My improved construction can be placed in operative position after the driver and passengers have seated themselves and may also be removed to a non-interfering position before leaving the car.

As illustrated my portable arm rest comprises a frame A adapted to rest upon the seat cushion to extend transversely thereof and to a height thereabove suitable for forming the arm rest. The bottom of this frame is at an acute angle to the top thereof to bring the latter in a substantially horizontal plane, whereas the seat is inclined thereto. The frame is hollow both for lightness and also to provide a receptacle for articles that may be placed therein as hereinafter explained. Thus, as shown, the upper portion B is a boxlike structure having a hinged cover C which normally constitutes the rest but which can be easily opened for access to the contents. This cover has a cushioned top C' extending over and projecting slightly beyond the edges thereof and on which the arm directly rests. The lower portion of the frame is bifurcated to include the forward and rear leg portions D and E leaving therebetween an open space F. Such construction permits of hanging the rest, when not in use, over the top of the seat back and in rear thereof as will later be explained.

Where the rest is positioned for use of the driver of the car, it will be close to the steering wheel and would interfere with entering or leaving the driver's seat from the right-hand side. This difficulty is avoided by shifting the rest from its operative position to the top of the seat back, which latter will engage the space F between the legs D and E. The leg D is concaved on its inner face to form a hook to engage the seat top, which permits of turning the rest downward in rear of the seat as shown in Fig. 2. The rest is held more securely in this inoperative position by providing an arm G, which is hinged at G' to the front leg D and has a torsion spring $G^2$ for normally holding it in the position shown in Fig. 1 where it extends into the recess F. When, however, the rest is transferred to its inoperative position, the arm G is swung outward so as to extend downward at the front of the back cushion. This will prevent any danger of the rest dropping off from its engagement with the seat back. To avoid any danger of injuring the back cushion, a pad $G^3$ of sponge rubber or other resilient yieldable material is secured to the end of the arm.

The rest in its normal operative position is conveniently located for holding any articles which the rider may require while the car is in motion. Thus the boxlike portion B contains a compartment for holding a box of tissues, which is made accessible by swinging up the cover C on its hinges as illustrated in Fig. 3. A still more convenient arrangement is illustrated in the modified construction, Fig. 4, where the tissue box is inverted in the receptacle and the bottom B' is centrally cut away at $B^2$. Thus without disturbing the lid C, the rider may insert his hand into the space F and get hold of the tissue through the opening $B^2$. The space within the portion B is large enough for one or more other compartments, which may be used for holding a package of cigarettes, a lighter or any other article that may be needed. For disposing of the tissue after using the same, a compartment E' is formed in the rear leg E and an aperture $E^2$ in the side of this leg will permit of tucking the tissue into the compartment. A hinged cover $E^3$ at the rear side of the leg E may be opened to remove the tissues.

With the construction as described, the arm rest may be stored in its inoperative position whenever it is not in use, where it will not interfere either with entering or leaving the front or the rear seats of the car. When the driver and passengers are seated, the rest is removed from its storage position and placed on the seat cushion where it may support the right arm of the driver while his hand is on the steering wheel. The rest may, of course, be used on the rear seat or even on the front seat to the left of the driver if no other rest is provided for his left arm. The structure is so light in weight that it may be easily moved from one position to another.

What I claim as my invention is:

1. A portable arm rest for vehicle seats comprising a frame for resting upon and extending transversely across a vehicle seat intermediate the ends thereof, the upper end of said frame being at a height for supporting the arm of the occupant of the seat, and the bottom portion of said frame being centrally cut away to engage the top of the seat back for storage of the arm rest when not in use.

2. The construction as in claim 1 provided with a hinged arm located in the cut away portion when the rest is in operative position, and adapted in storage position to extend down in front of the seat back for securing the rest thereto with its major portion in rear of the back.

3. The construction as in claim 2 having a spring for said arm biased to hold the latter within the cut away portion when the rest is in use but permitting outward swinging for the storage position.

4. The construction as in claim 2 in which the frame is hollow forming a storage receptacle in the upper portion thereof with a hinged cover for closing the same constituting the direct arm rest, and also provided with an additional receptacle in a hollow portion of the frame at one end of the cut away portion thereof, one wall of the latter receptacle having an aperture therein for access thereto.

5. The construction as in claim 4 in which the bottom of the first mentioned receptacle is centrally apertured for access to the contents of said receptacle through said cut away portion when the cover is closed.

ALLARD S. FAWCETT.

REFERENCES CITED

The following references are of record in the file of this patent:

UNITED STATES PATENTS

| Number | Name | Date |
|---|---|---|
| 2,006,883 | Davies | July 2, 1935 |
| 2,160,282 | Rehg | May 30, 1939 |
| 2,524,909 | Hines | Oct. 10, 1950 |